United States Patent
Gillet et al.

(10) Patent No.: US 8,061,617 B2
(45) Date of Patent: Nov. 22, 2011

(54) ENHANCED RESOLUTION AUTOMATIC DATA COLLECTION APPARATUS AND METHOD USING AN AFOCAL OPTICAL ELEMENT

(75) Inventors: Alain Gillet, Toulouse (FR); Jean-Louis Massieu, Montauban (FR)

(73) Assignee: Intermec IP Corp., Everett, WA (US)

( * ) Notice: Subject to any disclaimer, the term of this patent is extended or adjusted under 35 U.S.C. 154(b) by 1151 days.

(21) Appl. No.: 11/829,398

(22) Filed: Jul. 27, 2007

(65) Prior Publication Data

US 2008/0023552 A1   Jan. 31, 2008

Related U.S. Application Data

(60) Provisional application No. 60/820,689, filed on Jul. 28, 2006.

(51) Int. Cl.
- G02B 5/08 (2006.01)
- G02B 26/00 (2006.01)
- G02B 5/00 (2006.01)
- G02B 5/32 (2006.01)
- G06K 7/10 (2006.01)

(52) U.S. Cl. ......... 235/462.36; 235/462.46; 235/462.32; 235/462.34; 235/462.01; 235/472.01

(58) Field of Classification Search ............ 235/462.01, 235/462.32, 462.46, 462.34, 472.01, 462.36; 359/492, 196, 212
See application file for complete search history.

(56) References Cited

U.S. PATENT DOCUMENTS

| | | | |
|---|---|---|---|
| 2,062,468 A * | 12/1936 | Matz | 359/291 |
| 4,988,852 A | 1/1991 | Krishnan | 235/462 |
| 5,245,384 A * | 9/1993 | Mori | 355/67 |
| 5,378,883 A | 1/1995 | Batterman et al. | 235/472 |
| 5,574,598 A | 11/1996 | Koumura et al. | 359/666 |
| 5,640,001 A | 6/1997 | Danielson et al. | 235/472 |
| 5,801,371 A | 9/1998 | Kahn et al. | 235/472 |
| 5,864,128 A | 1/1999 | Plesko | 235/462 |
| 5,914,480 A * | 6/1999 | Swartz | 235/472.01 |
| 5,966,230 A * | 10/1999 | Swartz et al. | 235/462.32 |

(Continued)

FOREIGN PATENT DOCUMENTS

JP   7-105305   4/1995

OTHER PUBLICATIONS

Amtech Corporation Product Catalog 1194, Readers, 1994, pp. 1-10, 1-11, 1-20, and 1-21.

(Continued)

*Primary Examiner* — Thien Mai
(74) *Attorney, Agent, or Firm* — Seed IP Law Group PLLC (57) ABSTRACT

An automatic data collection device, such as a scanner-type device, is provided with an afocal optical element, such as an afocal lens, that operates in conjunction with a scanning mirror to scan a target machine-readable symbol using a scanning beam. The scanning mirror deflects a light beam into the afocal lens. The afocal lens operates to change a resolution or width of the scanning beam for far-field scanning, for example, where resolution is increased by the afocal lens. The afocal lens can also operate to change the resolution or width of the scanning beam for near-field scanning, for example, where resolution is decreased by the afocal lens.

25 Claims, 6 Drawing Sheets

U.S. PATENT DOCUMENTS

| | | | | |
|---|---|---|---|---|
| 6,027,021 | A | | 2/2000 | Kumar .......................... 235/462 |
| 6,053,409 | A | * | 4/2000 | Brobst et al. ............. 235/462.36 |
| 6,059,188 | A | * | 5/2000 | diFazio et al. ............ 235/462.36 |
| 6,094,289 | A | * | 7/2000 | Moranski et al. ........ 235/462.01 |
| 6,097,301 | A | | 8/2000 | Tuttle ......................... 340/693.9 |
| 6,104,333 | A | | 8/2000 | Wood, Jr. ...................... 341/173 |
| 6,127,928 | A | | 10/2000 | Issacman et al. .......... 340/572.1 |
| 6,155,490 | A | | 12/2000 | Ackley ...................... 235/472.01 |
| 6,286,763 | B1 | | 9/2001 | Reynolds et al. ........ 235/472.01 |
| 6,330,974 | B1 | | 12/2001 | Ackley ...................... 234/472.01 |
| 6,369,954 | B1 | | 4/2002 | Berge et al. ................... 359/666 |
| 6,484,944 | B1 | | 11/2002 | Manine et al. ........... 235/462.38 |
| 6,732,930 | B2 | | 5/2004 | Massieu et al. ............ 235/462.1 |
| 7,296,749 | B2 | | 11/2007 | Massieu .................... 235/462.23 |
| 7,457,007 | B2 | * | 11/2008 | Silverbrook et al. .... 235/462.01 |
| 2001/0002033 | A1 | | 5/2001 | Winarski et al. .............. 235/383 |
| 2002/0158131 | A1 | * | 10/2002 | Dickson et al. ........... 235/462.34 |
| 2007/0063048 | A1 | * | 3/2007 | Havens et al. ............ 235/462.46 |
| 2007/0295817 | A1 | | 12/2007 | Massiue et al. .......... 235/462.23 |

OTHER PUBLICATIONS

Berge, B., et al., "Variable Focal Lens Controlled by an External Voltage: An Application of Electrowetting," *The European Physical Journal E*, 3:159-163, 2000.

Chern, N., et al., "Practical Issues in Pixel-Based Autofocusing for Machine Vision," in *Proceedings of the 2001 IEEE International Conference on Robotics and Automation*, Seoul, Korea, May 21-26, 2001, pp. 2791-2796.

Command Codes for the AMTECHh Model AI-1200 Reader, Versions 2.1, 2.2 and 2.30, Oct. 11, 1988, pp. 1 and 33.

Fanget, S., et al., "Integrated Deformable Mirror on Silicon for Optical Data Storage," MOEMS Display and Imaging Systems III, Proceedings of SPIE, Bellingham, Washington, 2005, vol. 5721, pp. 159-169.

Keren, D., et al., "Restoring Subsampled Color Images," *Machine Vision and Applications*, 11:197-202, 1999.

Love, G., "Adaptive Optical Components Using Liquid Crystal Devices," *Journal of the Communications Research Laboratory*, 46(3):427-430, Nov. 1999.

Marino, B., et al., "Improving the Performance of Single Chip Image Capture Devices," *Journal of Electronic Imaging*, 12(2):209- 218, Apr. 2003.

Palmer, Roger C., "The Bar Code Book," Third Edition, Helmers Publishing, Inc., Peterborough, N.H., U.S.A., 1995 (ISBN 0-911261-09-5).—Reference Book—Copy Available Upon Request.

Ramanath, R., et al., "Demosaicking Methods for Bayer Color Arrays," *Journal of Electronic Imaging*, 11(3):306-315, Jul. 2002.

Schechner, Y., et al., "The Optimal Axial Interval in Estimating Depth From Defocus," *Proceedings of the International Conference on Computer Vision*, Kerkyra, 1999, pp. 834-838.

Specifying and Installing AMTECH Products, Dallas, Texas, Jun. 6-10, 1988, "The AUX-2. Serial Port," pp. 1, 6, and 7.

Subbarao, M., et al., "Focusing Techniques," in *Proceedings of the OE/Technology SPIE Conference*, Boston, MA, Nov. 1992.

Subbarao, M., et al., "The Optimal Focus Measure for Passive Autofocusing and Depth-From-Focus," SPIE, vol. 2598, pp. 89-99.

Vdovin, G., "Fast Focusing of Imaging Optics Using Micromachined Adaptive Mirrors," Apr. 1997, URL=http://guernsey.et.tudelft.nl/focus/, download date Jun. 21, 2005.

Vdovin, G., et al., "Flexible Mirror Micromachined in Silicon," Applied Optics, vol. 34, No. 16, Jun. 1, 1995, pp. 2968-2972.

Vdovin, G., et al., "Technology and Applications of Micromachined Silicon Adaptive Mirrors," Optical Engineering, vol. 36, No. 5, May 1997, pp. 1382-1390.

Wei, T-C, "Three Dimensional Machine Vision Using Image Defocus," dissertation, State University Of New York, 1994.

Wolter, A., et al., "The MEMS Micro Scanning Mirror for Barcode Reading: From Development to Production," MOEMS Display and Imaging Systems II, Proceedings of SPIE, Bellingham, Washington, 2004, vol. 5348, pp. 32-39.

* cited by examiner

ENHANCED RESOLUTION AUTOMATIC DATA COLLECTION APPARATUS AND METHOD USING AN AFOCAL OPTICAL ELEMENT

CROSS REFERENCE TO RELATED APPLICATION

The present application claims the benefit under 35 U.S.C. §119(e) of U.S. Provisional Patent Application Ser. No. 60/820,689, entitled "ENHANCED RESOLUTION AUTOMATIC DATA COLLECTION APPARATUS AND METHOD USING AN AFOCAL OPTICAL ELEMENT," filed Jul. 28, 2006, assigned to the same assignee as the present application, and incorporated herein by reference in its entirety.

TECHNICAL FIELD

The present disclosure relates generally to electronic devices for reading data carriers, such as machine-readable symbols (e.g., barcodes, stacked codes, matrix codes, and the like), and more particularly but not exclusively, relates to techniques to provide enhanced resolution when scanning machine-readable symbols using an automatic data collection device.

BACKGROUND INFORMATION

The automatic data collection (ADC) arts include numerous systems for representing information in machine-readable form. For example, a variety of symbologies exist for representing information in barcode symbols, matrix or area code symbols, and/or stacked symbols. A symbology typically refers to a set of machine-readable symbol characters, some of which are mapped to a set of human-recognizable symbols such as alphabetic characters and/or numeric values. Machine-readable symbols are typically comprised of machine-readable symbol characters selected from the particular symbology to encode information. Machine-readable symbols typically encode information about an object on which the machine-readable symbol is printed, etched, carried or attached to, for example, via packaging or a tag.

Barcode symbols are a common one-dimensional (1D) form of machine-readable symbols. Barcode symbols typically comprise a pattern of vertical bars of various widths separated by spaces of various widths, with information encoded in the relative thickness of the bars and/or spaces, each of which have different light reflecting properties. One-dimensional barcode symbols require a relatively large space to convey a small amount of data.

Two-dimensional symbologies have been developed to increase the data density of machine-readable symbols. Some examples of two-dimensional symbologies include stacked code symbologies. Stacked code symbologies may be employed where length limitations undesirably limit the amount of information in the machine-readable symbol. Stacked code symbols typically employ several lines of vertically stacked one-dimensional symbols. The increase in information density is realized by reducing or eliminating the space that would typically be required between individual barcode symbols.

Some other examples of two-dimensional symbologies include matrix or area code symbologies (hereinafter "matrix code"). A matrix code symbol typically has a two-dimensional perimeter, and comprises a number of geometric elements distributed in a pattern within the perimeter. The perimeter may, for example, be generally square, rectangular or round. The geometric elements may, for example, be square, round, or polygonal, for example hexagonal. The two-dimensional nature of such a machine-readable symbol allows more information to be encoded in a given area than a one-dimensional barcode symbol.

The various above-described machine-readable symbols may or may not also employ color to increase information density.

A variety of machine-readable symbol readers for reading machine-readable symbols are known. Machine-readable symbol readers typically employ one of two fundamental approaches, scanning or imaging.

In scanning, a focused beam of light is scanned across the machine-readable symbol, and light reflected or returned from and modulated by the machine-readable symbol is received by the reader and demodulated. With some readers, the machine-readable symbol is moved past the reader, with other readers the reader is moved past the machine-readable symbol, and still other readers move the beam of light across the machine-readable symbol while the reader and machine-readable symbol remain approximately fixed with respect to one another. Demodulation typically includes an analog-to-digital conversion and a decoding of the resulting digital signal.

Scanning-type machine-readable symbol readers typically employ a source of coherent light such as a laser diode to produce a beam, and employ a beam deflection system such as a rotating or oscillating mirror to scan the resulting beam across the machine-readable symbols. Conventional laser scanning systems employ progressive symbol sampling.

In imaging, the machine-readable symbol reader may flood the machine-readable symbol with light, or may rely on ambient lighting. A one-dimensional (linear) or two-dimensional image (2D) capture device or imager such as a charge coupled device (CCD) array captures a digital image of the illuminated machine-readable symbol, typically by electronically sampling or scanning the pixels of the two-dimensional image capture device. The captured image is then decoded, typically without the need to perform an analog to digital conversion.

A two-dimensional machine-readable symbol reader system may convert, for example, two-dimensional symbols into pixels. See, for example, U.S. Pat. No. 4,988,852 issued to Krishnan, U.S. Pat. No. 5,378,883 issued to Batterman, et al., U.S. Pat. No. 6,330,974 issued to Ackley, U.S. Pat. No. 6,484,944 issued to Manine, et al., and U.S. Pat. No. 6,732,930 issued to Massieu, et al.

Regardless of the type of data carrier used, their usefulness is limited by the capability of a data collection device (such as a matrix code reader, barcode reader, and the like) to accurately capture the data encoded in the machine-readable symbol. Optical data collection devices are directional in nature—such devices need to be optimally positioned in order to accurately read the data on the target symbol. For example, if the data collection device is positioned too far from a target machine-readable symbol, then the target machine-readable symbol may be out of range or otherwise outside of an optimal focus distance of the data collection device. As a result, the data encoded in the target machine-readable system may not be read or may be read incorrectly. The inability of an inexperienced user to skillfully position the data collection device also contributes to the directional limitations of such devices, thereby further contributing to the chances of erroneous or missed data readings.

The quality of the optical resolution of an automatic data collection device is often dependent upon the type of components used by the automatic data collection device in the scanning and/or imaging process. For example, some scanning-type data collection devices use a microelectromechanical structure (MEMS) scanner. The MEMS scanner includes a scanning mirror that oscillates at a resonance frequency to deflect a light beam incident thereon across a target machine-readable symbol.

The size of the scanning mirror can be minimized to allow oscillation at a high frequency, thereby allowing the design of miniature scanners with high throughput capabilities. However, the effects of diffraction limit the maximum resolution that can be obtained when using a scanning mirror having reduced size, particularly when scanning far-field target machine-readable symbols. As a result, it can be difficult for an automatic data collection device having a reduced-size MEMS scanning mirror to effectively read far-field target machine-readable symbols. In short, the small size of such MEMs scanning mirrors inherently limits the optical resolution at far-field.

A possible approach to the above-described problem is to provide the automatic data collection devices with multiple scanning mirrors having different sizes (and thus different resonance frequencies). A particular one of the scanning mirrors can be selected for each specific scanning condition (e.g., reading at a far field, reading at a near field, etc.), thereby providing some basic adaptive capabilities. However, such an approach is not practical due to the costly nature of the MEMS manufacturing process, due to the inflexibility of the automatic data collection device where none of the scanning mirrors is suitable for a particular scanning situation, and/or due to other reasons.

BRIEF SUMMARY

One aspect provides a method for reading data carriers such as machine-readable symbols using an automatic data collection device. The method include generating a light beam, directing the light beam to a scanning mirror, and directing the light beam from the scanning mirror to an afocal optical element. The light beam is incident on the afocal optical element. The afocal optical element is used to change a characteristic associated with a scanning beam. The light beam exits from the afocal optical element as the scanning beam having the changed characteristic and is directed the onto a target machine-readable symbol.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Embodiments of an enhanced resolution automatic data collection apparatus and method using an afocal optical element are described herein. The data collection device may also be provided with an adaptive field of view (FOV) by using the afocal optical element. In the following description, numerous specific details are given to provide a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract provided herein are for convenience only and do not interpret the scope or meaning of the embodiments.

As an overview, an automatic data collection device of an embodiment is provided for reading a target machine-readable symbol, such as barcode symbols, stacked code symbols, matrix code symbols, or other types of one-dimensional (1D) or two-dimensional (2D) machine-readable symbols by scanning. The data collection device includes a light source to provide a scanning beam to scan the target machine-readable symbol and a scanning mirror to deflect the scanning beam across the target machine-readable symbol. The scanning mirror of one embodiment is a microelectromechanical structure (MEMS) mirror.

In one embodiment, the automatic data collection device includes an afocal optical element that operates in conjunction with the scanning mirror to change the optical resolution and field of view of the automatic data collection device. The afocal element of one embodiment comprises an afocal lens that is placed in the path of the light beam that is reflected or deflected from the scanning mirror. Due to the afocal properties of the afocal lens, the light beam passing therethrough can be expanded (or compressed). An expanded light beam (and thus increased resolution) having a decreased field of view (e.g., a decreased scanning angle) from the afocal lens can be used for far-field scanning. A compressed light beam (and thus decreased resolution) having an increased field of view (e.g., an increased scanning angle) from the afocal lens can be used for near-field scanning.

According to one embodiment, the afocal lens can comprise an optical window that covers the MEMS scanning mirror, such as by enclosing or sealing a die on which the MEMS scanning mirror is formed. In another embodiment, the afocal lens can be integrated with or otherwise coupled to a housing of the automatic data collection device.

Figure 1:
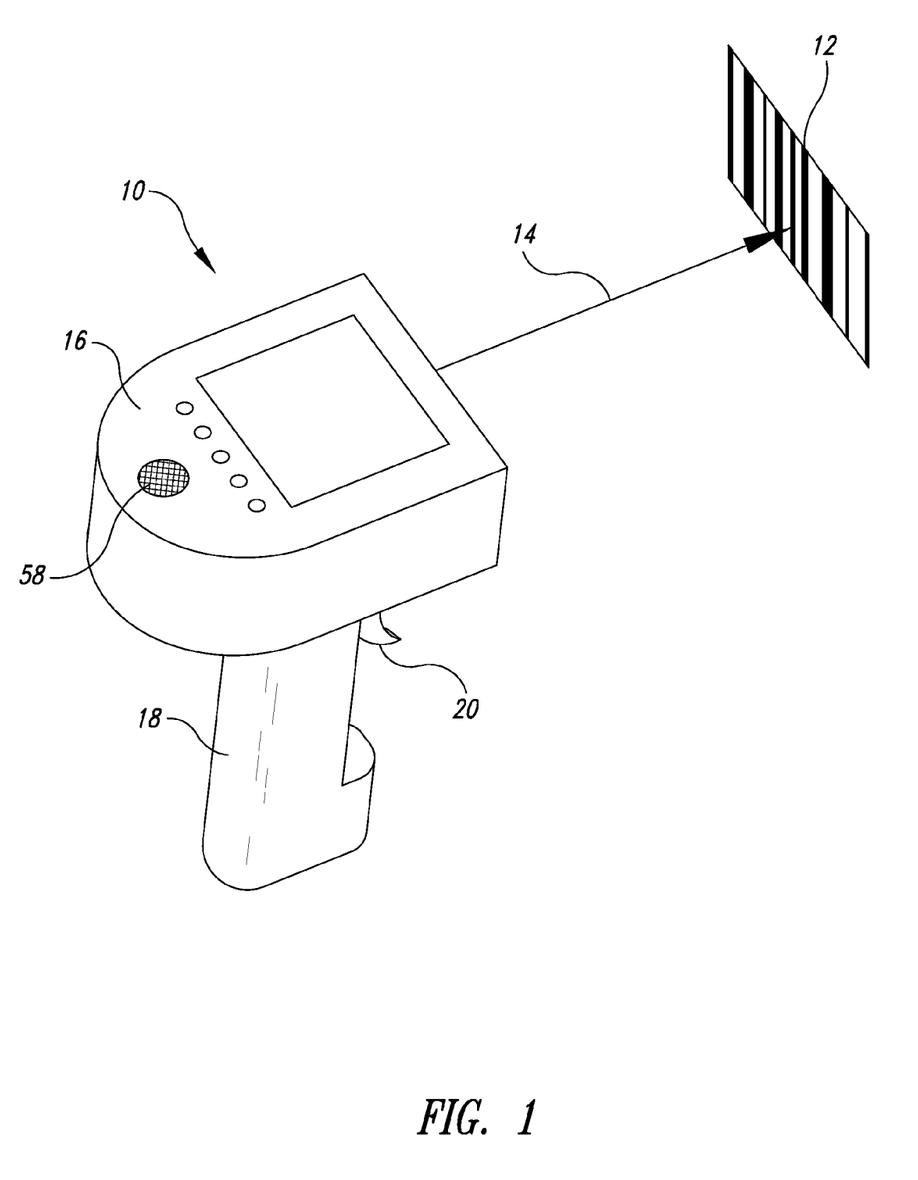
FIG. 1 is an upper isometric view of an embodiment of an automatic data collection device directing a scanning beam towards at least one target machine-readable symbol, such as a barcode symbol.

FIG. 1 shows an automatic data collection device 10 for reading one or more target machine-readable symbols, such a barcode symbol 12 or some other machine-readable symbol using a scanning technique. While the barcode symbol 12 is illustrated, it is appreciated that the target machine-readable symbol may be embodied as any other type of one-dimensional (1D) or two-dimensional (2D) machine-readable symbol that can be scanned by a scanning beam 14. A stacked code symbol is but one example of a 2D symbol that can be scanned. For the sake of simplicity of explanation hereinafter and unless the context is otherwise, the various embodiments pertaining to the data collection device 10 will herein be described with respect to a target machine-readable symbol being in the form of the barcode symbol 12.

The data collection device 10 includes a head 16, a handle 18, and an actuator such as a trigger 20. While the trigger 20 is shown with a specific shape and in a specific location in the embodiment of FIG. 1, other embodiments may employ different arrangements. For example, the trigger 20 can be embodied as a side-mounted finger trigger, top-mounted thumb trigger, button or key, touch screen, and other arrangements. One embodiment further provides a proximity trigger, which uses optics, acoustics, or other mechanism to determine proximity of an object to automatically activate without requiring a user to pull the trigger. In one embodiment, the trigger 20 can be implemented as a multi-position trigger that can be pulled/pressed in stages. For example, an initial press (e.g., pressing the trigger 20 halfway) can be used to perform focusing (or other operations associated with changing the field of view or adjusting resolution, for example in one embodiment), and a further press (e.g., further pressing the trigger 20 to its fully pressed position) can be used to perform final data acquisition via scanning. In other embodiments, the trigger 20 can be actuated using successive trigger pulls to perform certain operations, somewhat analogous to single or double clicking a mouse.

The data collection device 10 can comprise a portable data collection device, a hand-held scanning device, or other suitable electronic device having the various data reading capabilities described herein. It is appreciated that some embodiments are provided that may not necessarily have the same shape or identical features or identical use as the embodiments illustrated in the various figures. However, such embodiments can nevertheless include an afocal optical element, such as an afocal lens, as will be explained in detail below.

The scanning beam 14 is symbolically depicted (for purposes of simplicity) in FIG. 1 as a single line, which represents one or more beams of light directed at and scanned across the barcode symbol 12. The scanning beam 14 can comprise diverging light, collimated light, or other beam profile or wavefront shape that can be controlled by an afocal lens and/or other optical elements of the data collection device 10.

Figure 2:
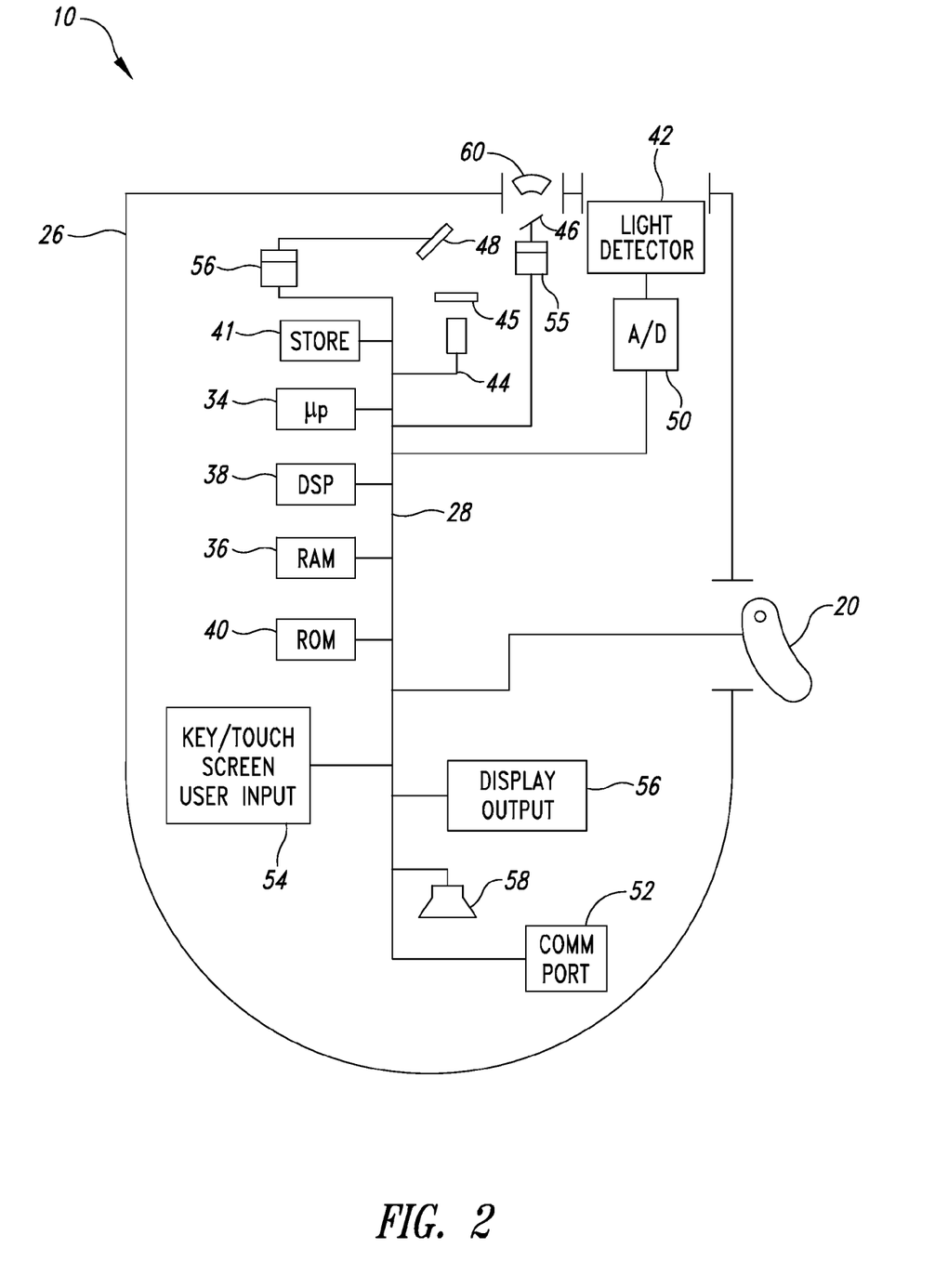
FIG. 2 is a functional block diagram of an embodiment of a data collection device, such as the data collection device of FIG. 1, that includes an afocal optical element, such as an afocal lens.

FIG. 2 is a functional block diagram of an embodiment of the data collection device 10. While the block diagram of FIG. 2 depicts a dedicated 1D and/or 2D data collection device that uses scanning (i.e., a single-mode device), such a data collection device is illustrated and described herein as a single-mode device only for convenience and clarity. The features depicted in the illustrated embodiment(s) can be suitably implemented in a multi-mode data collection device that is capable of reading any one or more of 1D, 2D, or other type of machine-readable symbols using scanning or imaging, and/or which may additionally read other types of automatic data collection (ADC) data carriers, including RFID and acoustical data carriers, for example.

As shown in the embodiment of FIG. 2, the data collection device 10 has a housing 26 that carries various components, symbolically shown as being coupled together via a bus 28. The bus 28 provides data, commands, signals, and/or power to the various components of the data collection device 10. The data collection device 10 can include an internal power source such as a rechargeable battery (not shown), or can receive power from an external power source such as a wall outlet by way of an electrical cord (not shown).

In one embodiment, the data collection device 10 includes a photodetector 42 or other suitable light detector, and one or more light sources 44 to generate light for the scanning beam 14 that reads a target machine-readable symbol, such as the barcode symbol 12. An example of the light source 44 of one embodiment is a laser, light emitting diode (LED), laser diode, or other suitable light source that can be used for scanning the target barcode symbol 12.

The data collection device 10 can employ suitable optics such as one or more lenses 45 (such as a pre-focusing lens), a mirror 48, and a scanning mirror 46 that is used to move the scanning beam 14 across the target barcode symbol 12. In an embodiment, the data collection device 10 includes an afocal optical element, such as an afocal lens 60 that is placed in front of the scanning mirror 46 or otherwise in the optical path of the scanning beam 14 deflected by the scanning mirror 46. Further details regarding the afocal lens 60 are provided below.

In operation, the light source 44 generates light, and the light is then directed through the lens 45 (which can for example collimate the light) to the mirror 48. The mirror 48 then reflects or deflects the light onto the scanning mirror 46. The scanning mirror 46 then directs the light incident thereon to the afocal lens 60 at some input angle. By passing the light through the afocal lens 60 in one embodiment, the width of the scanning beam 14 exiting from the afocal lens 60 can be increased (accompanied by a corresponding decrease in scanning angle) to thereby increase resolution for far-field scanning.

The scanning mirror 46 is driven or otherwise actuated by an actuator 55, so as to cause the light incident thereon to pass through the afocal lens 60 and scanned across the target barcode symbol 12 as the scanning beam 14. In one embodiment, the scanning mirror 46 comprises a MEMS mirror, and the actuator 55 can comprise an electrostatic actuator, a piezoelectric actuator, a magnetic actuator, or any other type of suitable actuator for the scanning mirror 46.

The mirror 48 of an embodiment comprises a still mirror. In another embodiment, the mirror 48 comprises a deformable mirror made from a deformable silicon membrane or other suitable component(s). Example components of an embodiment of a deformable mirror 48 and an embodiment of a process for manufacturing and using the deformable mirror 48 are described in further detail in commonly owned U.S. patent application Ser. No. 11/765,827, entitled "AUTOMATIC DATA COLLECTION APPARATUS AND METHOD FOR VARIABLE FOCUS USING A DEFORMABLE MIRROR," filed Jun. 20, 2007, which in turn claims priority from U.S. Provisional Patent Application Ser. No. 60/805,556, entitled "AUTOMATIC DATA COLLECTION APPARATUS AND METHOD FOR VARIABLE FOCUS USING A DEFORMABLE MIRROR," filed Jun. 22, 2006, both applications with inventors Jean-Louis Massieu, Jean Michel Puech, Alain Gillet, and Denis Jolivet, and incorporated herein by reference in their entireties.

In an embodiment where the mirror 48 is a deformable mirror, the mirror 48 can be deformed or otherwise actuated in a manner that the shape of the mirror 48 is changed by an actuator 56. The actuator 56 can comprise an electrostatic actuator, a piezoelectric actuator, a magnetic actuator, or any other type of suitable actuator for the mirror 48. For example, with an embodiment in which the mirror 48 is in the form of a deformable mirror that includes electrodes for applying repulsive/attractive electrostatic forces to a deformable silicon membrane, the actuator 56 can be an electrostatic actuator that applies the appropriate amount and the appropriate polarity of voltage potentials to specific electrodes. By changing the shape of the deformable mirror, the focal length, divergence, depth of field, wavefront shape, or other property associated with the scanning beam 14 can be changed.

A photodetector, phototransistor, or other light detector 42 can be positioned in a manner to sense light from the scanning beam 14 that is returned back from the target barcode symbol 12 and to generate an analog electrical signal (or other type of signal) representative of the received returned light.

An analog-to-digital (A/D) converter 50 transforms the analog electrical signals from the photodetector 42 and/or other signals into digital signals. For example for returned light that is received by the photodetector 42 that contains encoded data, the digital signals obtained from the received signals can be processed to decode or otherwise obtain the underlying encoded data.

In an embodiment of the data collection device 10 that has adaptive capability, the signal generated by the light detector 42 also can be used to determine whether there is a need to adjust the resolution (or other property associated with focusing the scanning beam 14), the field of view (FOV), or other characteristic associated with the scanning beam 14. For example and as will be explained in further detail below for an embodiment where the afocal lens 60 is adaptive, the signal generated by the light detector 42 can be analyzed to determine whether improved focusing is needed to get an improved resolution of the target barcode symbol 12, and if necessary, such feedback information can be used to cause a change in the optical properties of the afocal lens 60, thereby changing the output beam width of the scanning beam 14. In another embodiment, the afocal lens 60 is a static lens with fixed (non-adaptive properties), such that the afocal lens 60 expands the width of the scanning beam 14 for far-field scanning.

The data collection device 10 of FIG. 2 includes at least one microprocessor, controller, microcontroller, or other processor, which are symbolically shown as the single microprocessor 34. It is appreciated that the data collection device 10 may include separate dedicated processors for reading and processing barcode symbols, stacked code symbols, matrix code symbols, RFID tags, acoustical tags, or other types of other data carriers, as well as one or more processors for controlling operation of the data collection device 10.

Moreover, in one example embodiment at least one digital signal processor (DSP) 38 may be provided to cooperate with the microprocessor 34 to process signals and data returned from the symbols. Such signal processing may be performed for purposes of reading data from signals received from the target machine-readable symbol. For instance during decoding, the DSP 38 can perform image processing to extract the encoded data from the scanned target barcode symbol 12. The DSP 38 can also be used to process signals that result from scanning other types of 1D or 2D machine-readable symbols and/or from imaging machine-readable symbols (if the data collection device 10 is a multi-mode device having imaging capability).

In an embodiment, the microprocessor 34 can execute software or other machine-readable instructions stored in a machine-readable storage medium in order to perform the decoding or to otherwise control operation of the data collection device 10. In one embodiment involving an automatic data collection device 10 that has adaptive capability, such operations that can be controlled by the microprocessor 34 include operations associated with determining the resolution (or other property associated with focusing), the FOV, or other characteristic of the scanning beam 14 based on the data provided by the A/D converter and operations associated with making adjustments to the optical properties of an adaptive afocal lens 60 (and/or making changes to the amplitude of oscillation of the scanning mirror 46) in order to change the focus, resolution, FOV, or other characteristic of the scanning beam 14 exiting from the afocal lens 60. Such a storage medium can be embodied by a random access memory (RAM) 36, a read only memory (ROM) 40, or other storage medium 41. The software stored in the storage medium 41, for example, can include a control algorithm that can be used to assess the degree of focus/resolution, FOV, depth of field, or other scanning-related feature of the data collection device 10, and that can then initiate adjustment of the light exiting from the afocal lens 60.

As used in this herein, the ROM 40 includes any non-volatile memory, including erasable memories such as EEPROMs. The RAM 36 is provided to temporarily store data, such as a digital data from the A/D converter 50. The RAM 36 can also store other types of data, such as variable values, results of calculations, state data, or other information.

Symbol reading and decoding technology is well known in the art and will not be discussed in further detail. Many alternatives for scanners, symbol decoders, and optical elements that can be used in the data collection device 10 are taught in the book, The Bar Code Book, Third Edition, by Roger C. Palmer, Helmers Publishing, Inc., Peterborough, N.H., U.S.A. (1995) (ISBN 0-911261-09-5). Useful embodiments can also be derived from the various components disclosed in U.S. Pat. No. 6,286,763, issued Sep. 11, 2001, and assigned to the same assignee as the present application.

The data collection device 10 can include a communication port 52 to provide communications to external devices. The communication port 52 can be a hardwire or wireless interface, and can even employ an antenna, radio, USB connection, Ethernet connection, modem, or other type of communication device. The communication port 52 can provide communications over a communications network (not shown) to a host (not shown), allowing transmissions of data and/or commands between the data collection device 10 and the host. The communications network can take the form of a wired network, for example a local area network (LAN) (e.g., Ethernet, Token Ring), a wide area network (WAN), the Internet, the World Wide Web (WWW), wireless LAN (WLAN), wireless personal area network (WPAN), and other network. Alternatively or additionally, the communications network can be a wireless network, for example, employing infrared (IR), satellite, and/or RF communications.

The data collection device 10 includes a keypad, mouse, touch screen, or other user input device 54 to allow user input. It is appreciated that other devices for providing user input can be used. The user input device 54 is usable to allow the user to select modes (e.g., modes for reading matrix code symbols, barcode symbols, or other symbols), turn the data collection device 10 ON/OFF, adjust power levels, and others. The bus 28 couples the user input device 54 to the microprocessor 34 to allow the user to enter data and commands.

The bus 28 also couples the trigger 20 to the microprocessor 34. In response to activation of the trigger 20, the microprocessor 34 can cause the light source 44 to generate light that can be used as the scanning beam 14. In one embodiment where the data collection device 10 has adaptive capabilities, an initial press of the trigger 20 can be used to generate the scanning beam 14 to scan the target barcode symbol 12 and to initiate analysis of the returned light to determine degree of focus/resolution, FOV, depth of field, or other optical feedback information for adjusting the deformable mirror 48. Then, a subsequent or additional pressing of the trigger 20 can be used to initiate the final scanning, after the degree of focus or other characteristic associated with the scanning beam 14 has been optimized.

The data collection device 10 can include human-perceptible visual (e.g., a display output) and audio indicators 56 and 58 respectively. The bus 28 couples the visual and audio indicators 56 and 58 to the microprocessor 34 for control thereby. The visual indicators 56 take a variety of forms, for example: light emitting diodes (LEDs) or a graphic display such as a liquid crystal display (LCD) having pixels. These or other visual indicators can also provide other data associated with the operation of the data collection device 10, such as visual indicators to indicate whether the data collection device 10 is ON/OFF, reading, interrogating, low on battery power, successful or unsuccessful reads/interrogations, and so forth.

The audio indicator 58 can take the form of one or more dynamic, electrostatic or piezo-electric speakers, for example, operable to produce a variety of sounds (e.g., clicks and beeps), and/or frequencies (e.g., tones), and to operate at different volumes. Such sounds can convey various types of information, such as whether a symbol was successfully or unsuccessfully read, low battery power, or other information.

Figure 3:
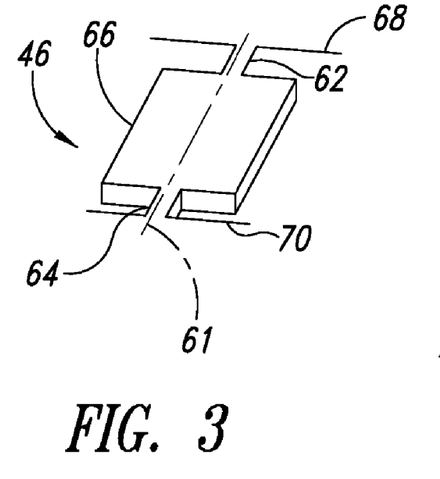
FIGS. 3-4 are upper isometric views of embodiments of microelectromechanical systems (MEMS) scanning mirrors that can be used in the data collection devices of FIGS. 1-2.
Figure 4:
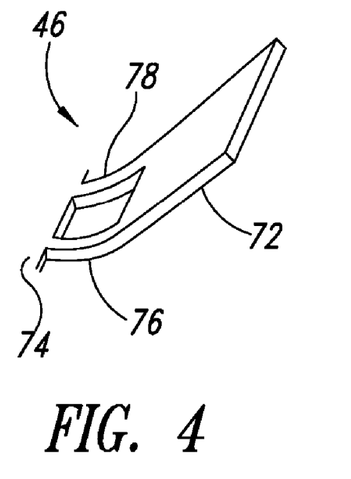

FIGS. 3 and 4 respectively show two possible embodiments of the scanning mirror 46. It is appreciated that the particular shape or other configuration of the scanning mirror 46 shown in FIGS. 3-4 are merely illustrative examples.

In the embodiment of FIG. 3, the scanning mirror 46 comprises a generally rectangular mirror element 66, with a torsional axis 61 extending along a pair of flexure beams 62 and 64 that extend on opposite sides of the mirror element 66. The flexure beams 62 and 64 are respectively coupled to base elements 68 and 70. When appropriate actuation is applied to the mirror element 66, the mirror element 66 undergoes out-of-plane rotation (relative to a plane formed by the base elements 68 and 70) or other displacement about the torsional axis 61.

In the embodiment of FIG. 4, the scanning mirror 46 comprises a generally rectangular mirror element 72 and one or more flexure beams 76 and 78 that extend from a single side of the mirror element 72. The flexure beams 76 and 72 are coupled to a base element 74. When appropriate actuation is applied to the mirror element 72, the mirror element 72 undergoes out-of-plane displacement (relative to a plane formed by the base element 74) due to flexing of the flexure beams 76 and 78.

In an embodiment, the mirror elements 66 and 72 of FIGS. 3-4, respectively, comprise a reflective material that is coated or otherwise placed on a silicon substrate. An example of the reflective material is aluminum (Al) or silver (Ag). Further in an embodiment, the mirror elements 66 and 72 can be manufactured using semiconductor processing technology, such as technology used for manufacturing MEMS mirrors that are actuated by electrostatic, piezoelectric, and/or magnetic actuators.

If the scanning mirror 46 of FIGS. 3-4 comprises a MEMS mirror, then the mirror elements 66 and 72 can be made very small and can have a low inertia, thereby allowing the mirror elements 66 and 72 to oscillate at a high speed. In diffraction-limited scanning conditions, the "spot" size of the scanning beam 14 is determined by the diffractive angular spread of light emanating from the oscillating scanning mirror 46. For the scanning mirror 46 oscillating at a cut-off frequency of $f_{cutoff}$, the scanning distance d to the target barcode symbol 12 can be determined according to the following relationship:

$$f_{cutoff} = D/(d*\lambda),$$

where $\lambda$ is the wavelength of the scanning beam 14, and D is the beam width of the scanning beam 14, as determined by the apparent width of the scanning mirror 46 in the direction of the scan. The apparent width of the scanning mirror 46 can be determined, for example, as the width of the angled reflective surface area (e.g., a portion of the overall reflective surface area) on the mirror element 66 (or on the mirror element 72) on which a collimated light beam reflected from the mirror 48 is incident.

Figure 5:
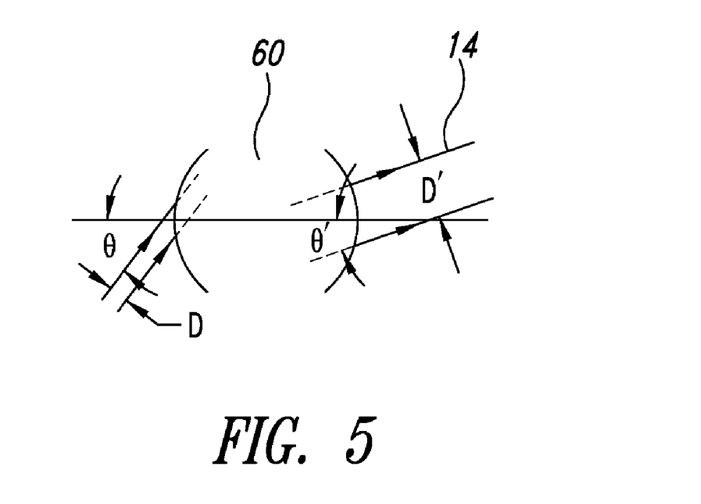
FIG. 5 is a diagram illustrating the optical effects of using an afocal lens according to one embodiment.

FIG. 5 illustrates the effect of placing the afocal lens 60 in front of the scanning mirror 46 to receive the collimated light that is deflected by the scanning mirror 46. The collimated light that enters the afocal lens 60 comprises paraxial rays of light with a collective input beam width D and with an input angle $\theta$. These rays of light exit the afocal lens 60 as parallel rays of the scanning beam 14, but at a different output angle $\theta'$ and with a different output beam width D'.

In an embodiment, the input beam width D is modified by the afocal lens 60 in inverse proportion to the angular gain (i.e., the change in $\theta$ to $\theta'$). For instance and as illustrated by way of example in FIG. 5, the output beam width D' is greater than the input beam width D, while the output angle $\theta'$ is less than the input angle $\theta$. Therefore, the increased beam width D' results in increased resolution, with the corresponding decreased output angle $\theta'$ resulting in a decreased scanning angle (e.g., a decreased FOV). Conversely, if the output beam width D' is less than the input beam width D, then the output angle $\theta'$ is greater than the input angle $\theta$.

The effect shown in FIG. 5 can be interpreted under the principle of conservation of resolution. With the quantities D, D' being the input and output aperture/beam widths and with $\theta$, $\theta'$ being the input and output chief angles, the Lagrange invariant I is given by the relation:

$$I = \theta*D = \theta'*D',$$

which is discussed in further detail in M. Bass et al., "Handbook of Optics: Devices, Measurements & Properties," Volumes 1-2, section 19.35 (1994).

With beam compression performed by the afocal lens 60, the output beam width D' is reduced (thereby reducing resolution), while the scanning angle $\theta'$ is increased to thereby increase the FOV. With beam expansion performed by the afocal lens 60, the output beam width D' is increased (thereby increasing resolution), while the scanning angle θ' is decreased to thereby decrease the FOV. With the reduction of the FOV, for example, the far-field diffraction blur can also be reduced by the same proportion (thereby improving the far-field resolution), in order to conserve the maximum number of points per scanning angle.

Figure 6:
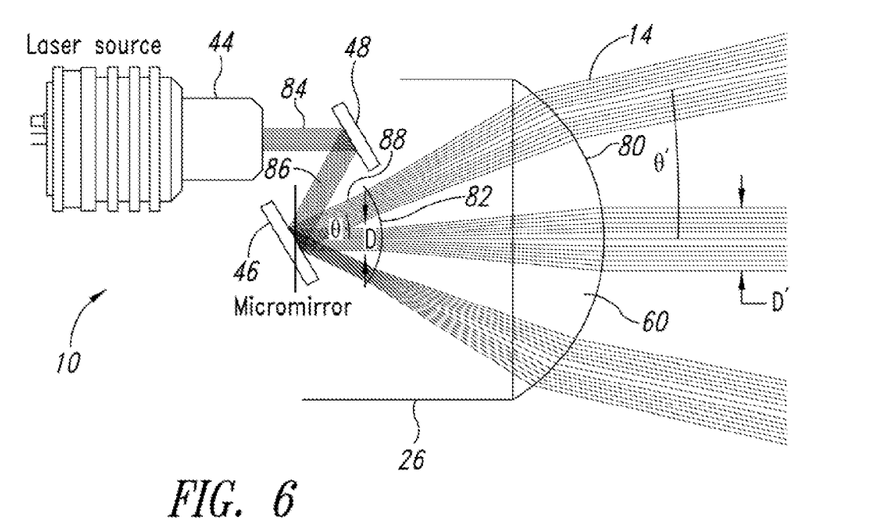
FIG. 6 is a top block diagram showing the optical effects that can be obtained when using an afocal lens in an embodiment of the data collection device of FIGS. 1-2.

FIG. 6 is a top block diagram showing illustrative optical properties of an embodiment of the data collection device 10 having the afocal lens 60. In the embodiment of FIG. 6, the afocal lens 60 is integrated with or otherwise coupled to the housing 26 of the data collection device 10, such that the afocal lens 60 is positioned in front of the scanning mirror 46.

The light source 44 (such as a laser source) generates light 84, which is collimated by the lens 45 (not shown). The light 84 is reflected or deflected as light 86 by the mirror 48 onto the scanning mirror 46. For purposes of illustration in FIG. 6, the mirror 48 is depicted as a still mirror and the scanning mirror 46 is depicted as a micromirror (such as a MEMS mirror). However, as explained previously above, other embodiments may use different types of mirrors 48 and 46, such as a deformable mirror for the 48, thereby providing capability to adapt the best focus plane to the condition of use of the data collection device 10, to dynamically adapt the focus of the light 86 impinging on the scanning mirror 46, and/or to otherwise optimize certain optical properties associated with the scanning beam 14.

The scanning mirror 46 has an apparent width (e.g., a fraction of its total reflective surface area) that receives the collimated light 86 deflected from the mirror 48. The scanning mirror 46 then deflects or otherwise directs the light 86 to a first curved surface 82 of the afocal lens 60. The light from the scanning mirror 46 that is incident on the first curved surface 82 is shown as a light beam 88 having an input angle θ and an input beam width D.

The rays of the light beam 88 pass through the afocal lens 60, and then exit from a second surface 80 of the afocal lens 60 as parallel rays of the scanning beam 14. In the example of FIG. 6, the output beam width D' is greater than the input beam width D, and the output angle θ' is less than the input angle θ. Therefore in the embodiment of FIG. 6, the afocal lens 60 is operating as a beam expander in which the scanning beam 14 exiting the afocal lens 60 has an increased beam width D' and a reduced scanning angle θ'—the FOV is thus being decreased while resolution is being increased (for far-field scanning, for example, where increased resolution is desirable).

The afocal lens 60 of one embodiment can comprise a meniscus lens forming a compact Galilean afocal lens. Parallel light rays entering the afocal lens 60 are also parallel when they exit—however, as depicted in FIG. 6, the collective beam width D' of the exiting parallel light rays may be different from the collective beam width D of the entering light rays. Thus, the afocal lens 60 of an embodiment does not have a focal length, or its focal point approaches infinity.

In other embodiments, lenses or optics different from meniscus lenses may be used. In such other embodiments, the beam expansion/compression shown and described above (such as the beam expansion for far-field scanning) can also be achieved through lenses and/or other optical elements having the appropriate radius, thickness, focal point, index of refraction, and/or other optical properties that influence the afocal behavior. As one possible example, an afocal optical element can be provided using embodiments of the microfluidic lens assembly disclosed in U.S. patent application Ser. No. 11/040,485, entitled "AUTOFOCUS BARCODE SCANNER AND THE LIKE EMPLOYING MICRO-FLUIDIC LENS," filed Jan. 20, 2005, assigned to the same assignee as the present application, and incorporated herein by reference in its entirety. Thus in various embodiments, the afocal properties of the lens 60 may be static (to provide constant beam expansion, as one example), while in some other embodiments, adaptive afocal properties for the lens 60 can be provided (such as via a deformable lens that can be shaped using liquid lens features, piezoelectric actuators, electromagnetic motors, etc.).

The scanning mirror 46 of FIG. 6 can be actuated as appropriate to move the scanning beam 14 across the target barcode symbol 12. In one embodiment, the amplitude of the oscillation of the scanning mirror 46 can be dynamically modified, thereby also dynamically modifying the scanning angle θ' and the related angular magnification (e.g., the output beam width D') of the afocal lens 60.

Figure 7:
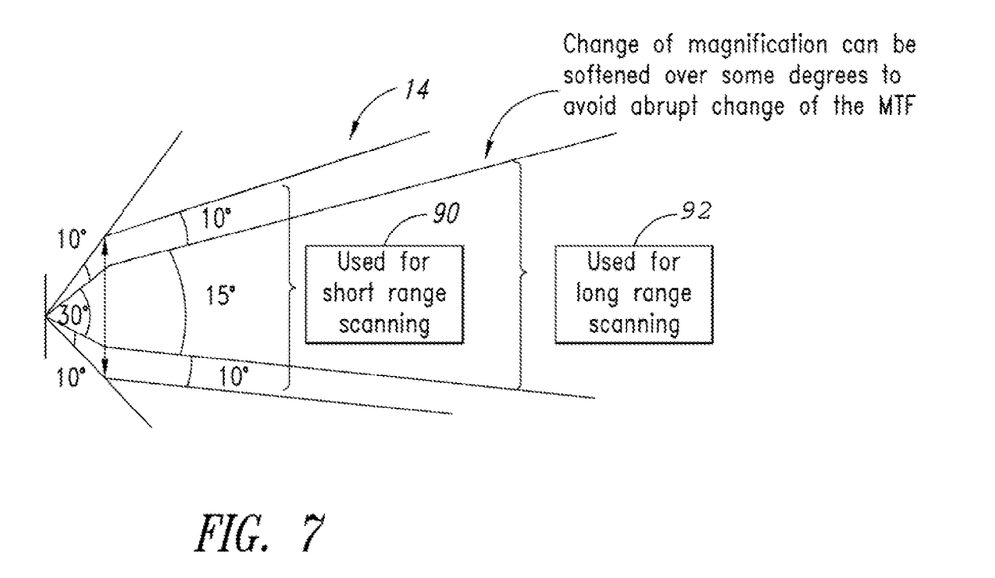
FIG. 7 is a diagram showing illustrative optical scanning geometries for an embodiment of the automatic data collection device of FIGS. 1-2.

FIG. 7 shows additional example geometries for the scanning beam 14. For instance, the scanning angle θ' can be adapted by varying the amplitude of oscillation of the scanning mirror 46. When scanning at near field (shown at 90 in FIG. 7), the amplitude of oscillation of the scanning mirror 46 can be made maximum, while its deformable mirror element 66 (or 72) is tuned to shorten the waist distance. Inversely, the amplitude of the oscillation of the scanning mirror 46 can be reduced when scanning at far field (shown at 92 in FIG. 7), while its deformable mirror element 66 (or 72) is tuned to a flatter shape to increase or otherwise push away the waist distance.

In an embodiment, the afocal lens 60 is provided with a varying magnification. For instance in one embodiment, the magnification or other optical gain of the afocal lens 60 varies from a maximum value on the optical axis (at a center of the lens) to a minimum value on the edge of the lens, thereby providing higher resolution in the middle of the "spot" formed by the scanning beam 14 on the target barcode symbol 12. This geometric distortion further reduces the FOV gain for large oscillations of the scanning mirror 46, which allows a reduction of the demand for maximum angles of oscillation of the scanning mirror 46.

Moreover, having an optical gain (e.g., magnification) that varies monotonously or non-linearly from the center to the edges of the FOV can be exploited to linearize the sinusoidal displacement of the spot (of the scanning beam 14) along the scanning plane. In an embodiment, changes in magnification can be "softened" or otherwise reduced gradually over some regions of the FOV can be provided in order to avoid abrupt changes in the modulation transfer function (MTF).

In the example of FIG. 6, the afocal lens 60 was described in the context of being integrated with or otherwise coupled to the housing 26 of the data collection device 10. Other techniques may be used to provide the afocal lens 60 for the data collection device 10.

Figure 8:
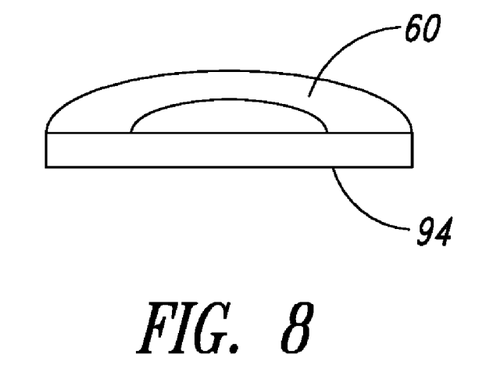
FIGS. 8-9 show example embodiments for providing the afocal lens in the data collection device of FIGS. 1-2.

For instance, in the embodiment of FIG. 8, the afocal lens 60 can be provided on a die 94 having the scanning mirror 46 formed thereon. In such an embodiment, the afocal lens 60 can comprise an injected plastic material or other material suitable for use as an optical window that covers the scanning mirror 46. Forming the afocal lens 60 on the die 94 serves to enclose/seal the die 94 for protective purposes, and also provides ease in the handling of the die 94 during manufacture and assembly of the data collection device 10.

The afocal lens 60 of FIG. 8 can be a static lens in one embodiment in which the afocal properties remain substantially constant. In another embodiment, the afocal lens 60 of FIG. 8 can have dynamically adaptive or otherwise changeable optical properties, such that the afocal properties of the afocal lens 60 can be changed. In such embodiments, the afocal lens 60 can be provided by way of a deformable lens or other type of lens having changeable optical properties.

Figure 9:
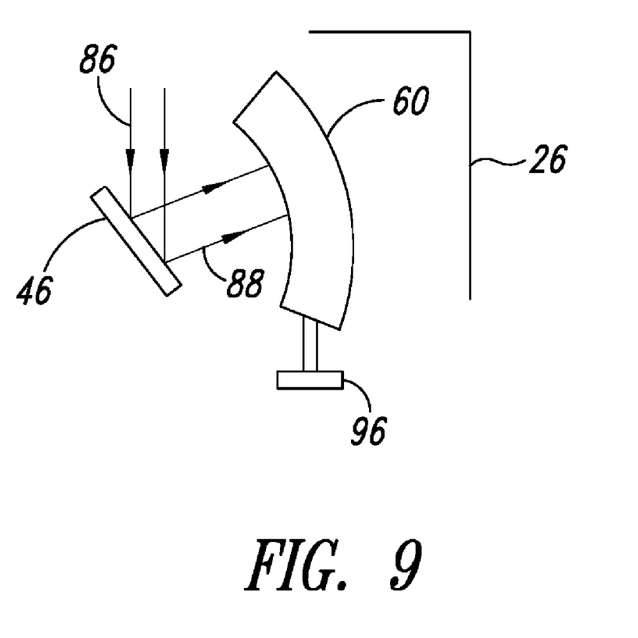

As another example shown in FIG. 9, the afocal lens 60 can be an internal component contained within the housing 26 of the data collection device 10, in a manner that the afocal lens 60 is separated from the scanning mirror 46 (unlike the embodiment of FIG. 8) or is not integrally formed with the housing 26 (unlike the embodiment of FIG. 6). In the embodiment of FIG. 9, for example, the afocal lens 60 is attached (to the housing 26 or to some other suitable internal structure of the data collection device 10) using a mounting element 96. The mounting element 96 can take the form of an adhesive, mechanical part(s), weld/solder, or other suitable element(s) that allow the afocal lens 60 to be appropriately placed in front of the scanning mirror 46 so as to receive the light beam 88 reflected or deflected therefrom.

The afocal lens 60 of FIG. 9 can be a static lens in one embodiment in which the afocal properties remain substantially constant. In another embodiment, the afocal lens 60 of FIG. 9 can have dynamically adaptive or otherwise changeable optical properties, such that the afocal properties of the afocal lens 60 can be changed. In such embodiments, the afocal lens 60 can be provided by way of a deformable lens or other type of lens having changeable optical properties.

Figure 10:
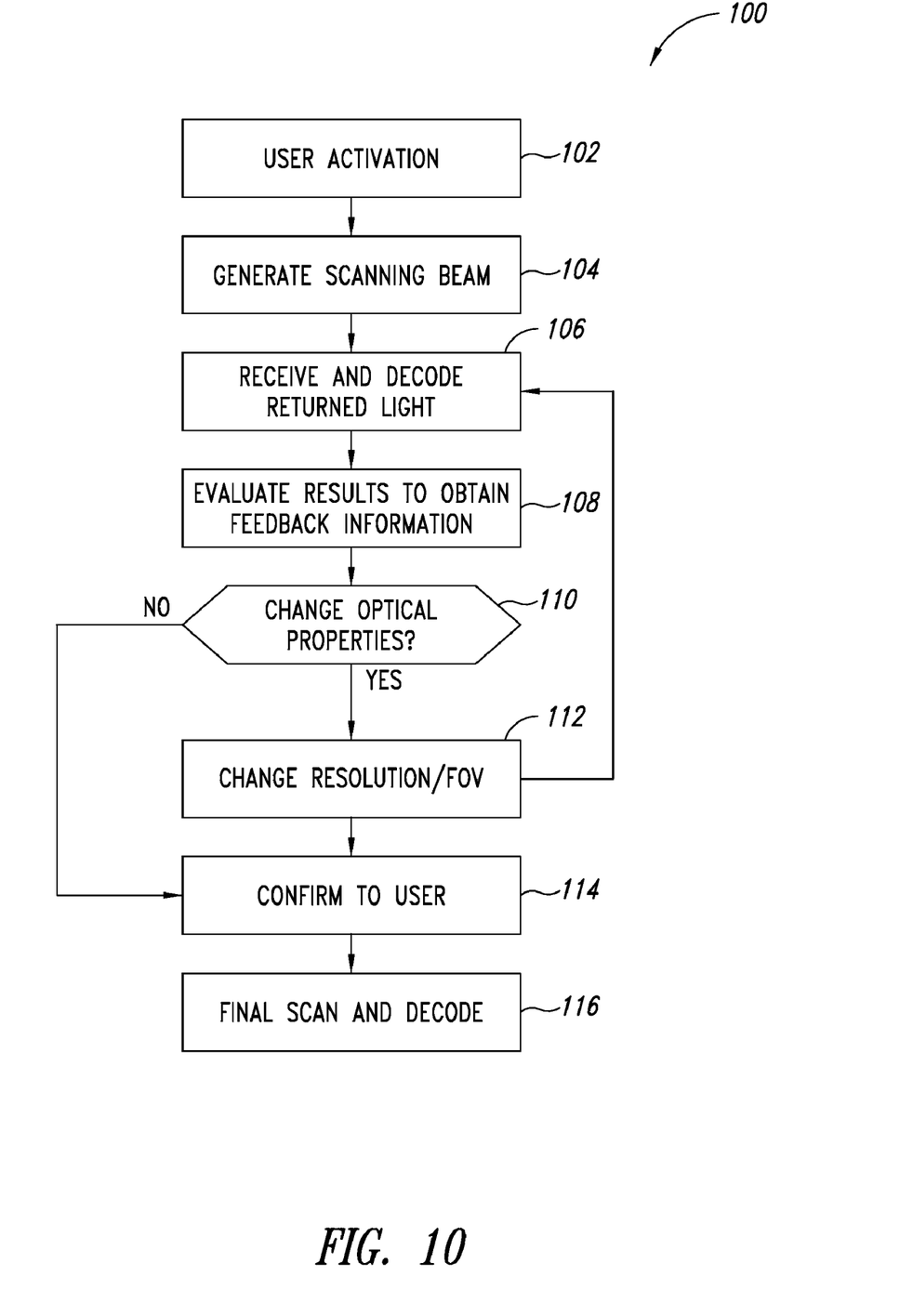
FIG. 10 shows an embodiment of a method for providing enhanced resolution and change in field of view for the data collection device of FIGS. 1-2.

FIG. 10 is a flow diagram 100 of a technique that involves scanning the target barcode symbol 12 using the afocal lens 60 to change the degree of resolution or size of FOV. In an embodiment, some of the operations depicted in the flow diagram 100 can be implemented through software or other machine-readable instructions executable by a processor (such as the microprocessor 34) and stored on a machine-readable medium (such as the storage medium 41, the RAM 36, or the ROM 40). It is appreciated certain operations in the flow diagram 100 can be suitably added, removed, combined, or modified in other embodiments, and that the various operations need not necessarily be performed in the exact manner shown.

Certain operations in the flow diagram 100 can be associated with embodiments where the afocal properties of the afocal lens 60 are static. Additionally or alternatively as will be described below, certain operations in the flow diagram 100 can also be associated with embodiments where the afocal lens 60 and/or other components of the data collection device 10 have adaptive properties, such as dynamically adaptive resolution properties.

The user activates the data collection device 10 for scanning the target barcode symbol 12 at a block 102. In one embodiment, pressing the trigger 20 can cause this activation. In yet another embodiment, the user can partly (not fully) press the trigger 20 at the block 102, thereby initiating a process in which scanning and decoding is performed to determine degree of resolution and/or the FOV size, for example, for determining whether enhanced resolution is needed for far-field scanning and/or for dynamically adjusting and adapting the resolution and/or FOV purposes, but without yet performing final data acquisition.

The light source 44 generates the scanning beam 14 at a block 104. For example and as shown in FIG. 6, the light source 44 can generate the light 84, which is then collimated and directed to the mirror 48. The light 84 is directed by the mirror 48 to the scanning mirror 46 as the light 86. The scanning mirror 46 directs the light 86 as the light beam 88 to the afocal lens 60, which then outputs the scanning beam 14 that is scanned across the target barcode symbol 12.

The light detector 42 receives the returned light from the target barcode symbol 12 at a block 106, and the returned light is converted to digital data by the A/D converter 50. The decoding algorithm decodes the digital data to obtain the data encoded in the target barcode symbol 12.

In one embodiment, the afocal lens 60 is a static lens that has performed constant beam expansion for far-field scanning, for instance. Thus, the results of scanning may be optimum, and therefore no additional scanning may need to be performed in order to accurately decode the scanned data.

In another embodiment where the data collection device 10 uses a static afocal lens 60, the data collection device 10 may need to determine whether the presents scanning condition involves near-field or far-field scanning. If for example far-field scanning was performed without using the static afocal lens 60, then the resolution associated with the return light at the block 106 may not be an optimum resolution. Therefore, certain evaluations can be performed at a block 108 to determine whether a new scan at far-field needs to be performed using the static afocal lens 60 so as to get improved resolution.

In embodiments where the afocal lens 60 is adaptive (and/or where the data collection device 10 has other adaptive capability) to allow dynamic change of resolution and FOV, the evaluations at the block 108 can also be performed to determine the appropriate change in an optical property (e.g., a change an amplitude of oscillation of the scanning mirror 46, a change a radius or other optical property of the adaptive afocal lens 60, etc) that will result in a corresponding change to a resolution or FOV.

Whether or not to change one or more optical properties associated with the afocal lens 60 and the scanning beam 14 (and by how much) can be based on one or more of the returned light (in analog form) received by the light detector 42, the digital data provided by the A/D converter 50, or the data decoded from the digital data. Such determination or other evaluation can be performed at the block 108.

For example, the strength of the analog signal provided by the light detector 42 can be indicative of the resolution of the target barcode symbol 12 that is being obtained by the data collection device 10. If the strength of the analog signal is too weak or otherwise falls below some minimum threshold level, then such a condition may indicate that the data collection device 10 is positioned too far from the target barcode symbol 12, thereby preventing adequate resolution from being obtained. Therefore, the a static afocal lens 60 may be used (if not used in a previous scan) to increase resolution for far-field scanning, and/or the amplitude of oscillation of the scanning mirror 46 may be decreased to increase resolution for far-field scanning, and/or optical properties (such as radius, thickness, etc.) of a deformable afocal lens 60 may be changed to increase magnification (beam width of the scanning beam 14) to increase resolution for far-field scanning.

Conversely, if the strength of the analog signal is too strong or otherwise exceeds some maximum threshold level, then such a condition may indicate that the data collection device 10 is positioned too close to the target barcode symbol 12, thereby indicating that there is excess resolution. Therefore, the opposite of the above corrective measures can be taken to reduce resolution for near-field scanning.

In one embodiment, the digital data provided by the A/D converter 50 is evaluated at the block 108 using the control algorithm stored in the storage medium 41 and executable by the microprocessor 34. For instance, the digital data can be evaluated for values that fall within or outside of certain expected values.

In yet another embodiment, the decoded data can be evaluated. For example, the decoding algorithm can decode the digital data, and then the control algorithm evaluates the results of the decoding. If the decoded data indicates missing or incorrect characters (characters from a UPC code, for instance), then such a result may indicate that the target barcode symbol 12 is positioned too far away and insufficient resolution is being provided, thereby resulting in missing/incorrect data. Incorrect or missing characters may also be present in near-field scanning, if the FOV is of insufficient size to fully scan the entire target barcode symbol 12.

As yet another example to evaluate the digital data and/or the decoded data, the digital data and/or the data decoded therefrom as a result of two or more scanning operations can be compared with one another. If two or more consecutive scans of the same barcode symbol 12 result in identical decoded data or other identical values, then such a condition may indicate that the proper resolution or FOV is present. Conversely, if there are inconsistent results in decoding data from the same target barcode symbol 12, then such a condition may indicate that the resolution and/or FOV is inadequate, thereby resulting in erroneous readings.

Other techniques for evaluating the analog signal, the digital data, the results of the decoding, etc. can be used by the focus control algorithm to determine the degree of focus, depth of field, or other property associated with the scanning beam 14 at the block 108.

At a block 110, the microprocessor 34 cooperates with the control algorithm to determine whether and to what degree to change one or more optical properties (e.g., use of an afocal lens, changing optical properties of a deformable afocal lens, changing an amplitude of oscillation of the scanning mirror 46, etc.), based on the evaluation performed at the block 108 that generates feedback information. If the evaluation at the block 108 indicates that some change in one or more optical properties is needed (such as to change the resolution or FOV), then the one or more optical properties is changed at a block 112. The resolution may be changed, for example as explained above, by changing the amplitude of oscillation of the scanning mirror 46, and/or by changing the optical properties of a deformable afocal lens 60.

The amplitude of oscillation of the scanning mirror 46 can be changed or otherwise controlled by application of voltage potentials to electrodes of the scanning mirror 46 by the actuator 55. The changes may be provided incrementally, until an optimum oscillation amplitude is obtained. Therefore, the process described above in blocks 106-112 can be repeated iteratively as necessary (e.g., decoding, evaluating results, changing the optical properties in response, etc.).

If the microprocessor 34 determines that no further change in the one or more optical properties is needed at the block 110, such as if the resolution or FOV is optimum, then a confirmation can be provided to the user at a block 114. For example, a flashing light, a green light, a beep, or other indicator can be provided to the user to indicate that the focus is optimum. The user can then fully press the trigger 20 or take some other action to perform the final scan and/or final decode at a block 116. Alternatively or additionally, the final scan and/or final decode need not necessarily be performed at the block 116—the scanning and decoding result that is obtained before confirmation of optimum focus can be used as the "final" result, without having to perform additional scanning or decoding.

In one embodiment, the audio or visual confirmation to the user at the block 114 need not be provided. The final result of the decoding, after having reached optimum resolution or FOV, can be identified and processed appropriately in a manner transparent to the user and without requiring any further action from the user.

Therefore, from the description provided above, it is evident that one embodiment allows finer control and tuning of the resolution and/or FOV of the scanning beam 14 by using the afocal lens 60. Furthermore, use of the feedback information for determining whether an adjustment to the resolution and/or FOV is needed removes the need for using multiple scanning mirrors in a same data collection device.

All of the above U.S. patents, U.S. patent application publications, U.S. patent applications, foreign patents, foreign patent applications and non-patent publications referred to in this specification and/or listed in the Application Data Sheet, are incorporated herein by reference, in their entireties.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, the data collection device 10 has been described above in the context of a scanner-type device having the afocal lens 60. It is appreciated that an embodiment can be provided where the data collection device 10 includes imaging capabilities, such as for imaging matrix code symbols or for imaging other types of 1D and/or 2D machine-readable symbol using imaging light. In such embodiments, the afocal lens 60 can be used to change a resolution, FOV, or other property associated with the imaging light.

These and other modifications can be made to the embodiments in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for reading machine-readable symbols using an automatic data collection device, the method comprising:
   generating a light beam;
   directing the light beam to a scanning mirror;
   directing the light beam from the scanning mirror to an afocal optical element, the light beam being incident on the afocal optical element;
   using the afocal optical element to change a characteristic associated with a scanning beam; and
   exiting the light beam from the afocal optical element as the scanning beam having the changed characteristic and directing the scanning beam having the changed characteristic onto a target machine-readable symbol,
   wherein using the afocal optical element to change the characteristic associated with the scanning beam includes using the afocal optical element to decrease a field of view and increase resolution for far-field scanning said target machine-readable symbol at a first time.

2. The method of claim 1, further comprising changing an amplitude of oscillation of the scanning mirror to correspondingly change a resolution associated with the scanning beam.

3. The method of claim 1 wherein directing the scanning beam to the target machine-readable symbol includes directing the scanning beam to a barcode symbol.

4. The method of claim 1 wherein using the afocal optical element to change the characteristic associated with the scanning beam includes using the afocal optical element to change a resolution associated with the scanning beam.

5. The method of claim 1 wherein using the afocal optical element to change the characteristic associated with the scanning beam includes using the afocal optical element to change a field of view associated with the scanning beam.

6. The method of claim 1 wherein directing the light beam from the scanning mirror to the afocal optical element includes directing the light beam to an afocal lens.

7. The method of claim 1, further comprising: using the afocal optical element to increase a field of view for near-field scanning said target machine-readable symbol at a second time.

8. The method of claim 1, further comprising varying a magnification of the afocal optical element to reduce a field of view for large oscillation of the scanning mirror and to linearize a spot displacement of the scanning beam along a scanning plane.

9. The method of claim 1, further comprising:
receiving at least a portion of light of the scanning beam that is returned from the target machine-readable symbol;
evaluating the received light to provide feedback information indicative of the characteristic associated with the scanning beam; and
using the feedback information to adaptively determine a degree of variation of an optical property associated with the afocal optical element to adjust said characteristic associated with the scanning beam.

10. An automatic data collection device to read machine-readable symbols, the automatic data collection device comprising:
a light source to generate light;
a scanning mirror positioned to have the generated light incident thereon and to deflect the incident light; and
an afocal optical element positioned to receive the deflected light from the scanning mirror and to output a scanning beam derived from the received deflected light, the scanning mirror being movable to move the scanning beam across a target machine-readable symbol, wherein the afocal optical element is adapted to provide an increase in a field of view and a corresponding decreased resolution associated with the scanning beam for near-field scanning.

11. The device of claim 10 wherein the afocal optical element comprises an afocal lens.

12. The device of claim 10 wherein the scanning mirror comprises a microelectromechanical structure (MEMS) mirror.

13. The device of claim 10 wherein the MEMS mirror is formed on a die, and wherein the afocal optical element comprises an optical window that covers the die having said MEMS mirror formed thereon.

14. The device of claim 10, further comprising an actuator coupled to said scanning mirror to vary an amplitude of oscillation of the scanning mirror to correspondingly vary a resolution associated with the scanning beam output from the afocal optical element.

15. An automatic data collection device to read machine-readable symbols, the automatic data collection device comprising:
a light source to generate light;
a scanning mirror positioned to have the generated light incident thereon and to deflect the incident light; and
an afocal optical element positioned to receive the deflected light from the scanning mirror and to output a scanning beam derived from the received deflected light, the scanning mirror being movable to move the scanning beam across a target machine-readable symbol, wherein the afocal optical element is adapted to provide a decrease in a field of view and a corresponding increased resolution associated with the scanning beam for far-field scanning.

16. The device of claim 10 wherein the afocal optical element has a varying magnification.

17. The device of claim 10, further comprising a housing to house the light source and scanning mirror, wherein the afocal optical element is coupled to the housing.

18. The device of claim 17, further comprising a mounting element to couple the afocal optical element to an internal structure inside the housing, in a manner that the afocal optical element is positioned to receive the deflected incident light from the scanning mirror.

19. The device of claim 10, further comprising a deformable mirror coupled between the light source and the scanning mirror to additionally change a characteristic associated with the scanning beam.

20. The device of claim 10, further comprising:
a light detector to detect a portion of light from the scanning beam that is returned from the target machine-readable symbol; and
a processor coupled to the light detector to evaluate the returned light from the target machine-readable symbol and from the returned light from the target machine-readable symbol, to provide feedback information indicative of a characteristic associated with the scanning beam, the processor further being coupled to make an adjustment to an optical property associated with the afocal optical element based on the feedback information.

21. The device of claim 20 wherein the light detector is adapted to generate an analog signal representative of the returned light from the target machine-readable symbol, the device further comprising:
an analog-to-digital converter coupled to the light detector to change the analog signal to a digital signal; and
a machine-readable medium to store a control algorithm executable by the processor to process the digital signal to decode data encoded by the target machine-readable symbol, wherein the processor in cooperation with the control algorithm is coupled to evaluate the analog signal, the digital signal, or the decoded data to determine a degree of adjustment of the optical property associated with the afocal optical element to correspondingly adjust said characteristic associated with the scanning beam.

22. The device of claim 10 wherein the afocal optical element comprises a deformable lens.

23. An article of manufacture, comprising:
a machine-readable medium having instructions stored thereon that are executable by a processor of an automatic data collection device to read machine-readable symbols, by:
causing generation of a light beam that is directed to a scanning mirror positioned to direct the light beam to pass through an afocal optical element to enable said afocal optical element to change a resolution or a field of view associated with said light beam;
actuating the scanning mirror to scan the light beam, which has passed through said afocal optical element and which has said associated resolution or field of view changed by said afocal optical element, across a target machine-readable symbol;
changing a first oscillation amplitude of the scanning mirror at a first time to correspondingly increase the field of view for near-field scanning; and
changing a second oscillation amplitude of the scanning mirror at a second time to correspondingly decrease the field of view and increase the resolution for far-field scanning;

evaluating light received from the target machine-readable symbol to determine a property associated with the light beam; and using the determined property and the afocal optical element to further change said resolution or field of view associated with the light beam scanned across the target machine-readable medium.

24. The article of manufacture of claim 23 wherein the instructions to use the determined property include instructions to change an amplitude of oscillation of the scanning mirror to correspondingly vary the resolution.

25. The article of manufacture of claim 23 wherein the instructions to evaluate the received light include instructions to evaluate an analog form of the received light, a digital form of the received light, or decoded data from the received light to determine an amount in which to change the resolution or field of view.

* * * * *